United States Patent
Kinder et al.

(10) Patent No.: US 10,841,337 B2
(45) Date of Patent: Nov. 17, 2020

(54) COMPUTER IMPLEMENTED SYSTEM AND METHOD, AND COMPUTER PROGRAM PRODUCT FOR REVERSIBLY REMEDIATING A SECURITY RISK

(71) Applicant: SECUREWORKS CORP., Wilmington, DE (US)

(72) Inventors: Ross Rowland Kinder, Ann Arbor, MI (US); William Urbanski, Whitefish, MT (US); Ryan James Leavengood, Boynton Beach, FL (US); Timothy Vidas, Omaha, NE (US); Jon Ramsey, Atlanta, GA (US)

(73) Assignee: SECUREWORKS CORP., Wilmington, DE (US)

( * ) Notice: Subject to any disclaimer, the term of this patent is extended or adjusted under 35 U.S.C. 154(b) by 218 days.

(21) Appl. No.: 15/816,133

(22) Filed: Nov. 17, 2017

(65) Prior Publication Data

US 2018/0152480 A1    May 31, 2018

Related U.S. Application Data

(60) Provisional application No. 62/426,962, filed on Nov. 28, 2016.

(51) Int. Cl.
*H04L 29/06* (2006.01)

(52) U.S. Cl.
CPC .......... *H04L 63/20* (2013.01); *H04L 63/1433* (2013.01)

(58) Field of Classification Search
CPC ...................................................... H04L 63/20
See application file for complete search history.

(56) References Cited

U.S. PATENT DOCUMENTS

| | | | |
|---|---|---|---|
| 5,937,066 A | 8/1999 | Gennaro | |
| 6,357,010 B1 | 3/2002 | Vies et al. | |
| 7,269,578 B2 | 9/2007 | Sweeney | |
| 7,331,061 B1 | 2/2008 | Ramsey et al. | |
| 7,548,932 B2 | 6/2009 | Horvitz et al. | |

(Continued)

FOREIGN PATENT DOCUMENTS

| | | |
|---|---|---|
| WO | WO2007002749 A2 | 1/2007 |
| WO | WO2007090605 A1 | 8/2007 |
| WO | WO2010059843 A2 | 5/2010 |

OTHER PUBLICATIONS

Buyukkayhan, Ahmet Sali; Oprea, Alina; Li, Zhou; and Robertson, William; *"Lens on the endpoint: Hunting for malicious software through endpoint data analysis"*; International Symposium on Research in Attacks, Intrusions, and Defenses; Raid 2017: Research in Attacks, Intrusions, and Defenses Proceedings; pp. 73-79; Sep. 18-20, 2017; Atlanta, GA, USA.

(Continued)

*Primary Examiner* — Simon P Kanaan
(74) *Attorney, Agent, or Firm* — Womble Bond Dickinson (US) LLP

(57) ABSTRACT

Systems and methods for reversibly remediating security risks, which monitor a network or system for security risks, and upon detection of one or more of risks, apply a remedial action applicable to at least partially remedy or mitigate the one or more detected risk. The network or system is monitored for a change to the detected risk(s), and upon detection of a change to the detected risk(s), the applied remediation action is automatically reversed.

17 Claims, 11 Drawing Sheets

(56) References Cited

U.S. PATENT DOCUMENTS

| | | |
|---|---|---|
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,805,881 B2 | 8/2014 | Hom et al. |
| 8,832,048 B2 | 9/2014 | Lim |
| 8,839,414 B2 | 9/2014 | Mantle et al. |
| 8,909,673 B2 | 12/2014 | Faitelson et al. |
| 8,928,476 B2 | 1/2015 | Jerhotova et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,137,262 B2 * | 9/2015 | Qureshi ............... H04L 67/10 |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 * | 1/2017 | Fleury ................. H04L 69/22 |
| 9,548,994 B2 | 1/2017 | Pearcy |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,742,559 B2 | 8/2017 | Christodorescu |
| 9,767,302 B2 | 9/2017 | Lim |
| 9,805,202 B2 | 10/2017 | Medeiros et al. |
| 9,973,524 B2 * | 5/2018 | Boyer ............... H04L 63/1433 |
| 10,050,992 B2 * | 8/2018 | Thyni ................. H04W 12/12 |
| 10,116,500 B1 | 10/2018 | Long |
| 10,311,231 B1 | 6/2019 | Kayyoor |
| 10,382,489 B2 * | 8/2019 | Das .................. H04L 63/145 |
| 10,425,223 B2 * | 9/2019 | Roth ................... H04L 9/0836 |
| 10,474,820 B2 * | 11/2019 | Manadhata ......... G06F 16/9554 |
| 10,491,632 B1 * | 11/2019 | Natarajan ............. H04W 4/12 |
| 2002/0129135 A1 | 9/2002 | Delany et al. |
| 2005/0138204 A1 | 6/2005 | Iyer et al. |
| 2005/0288939 A1 | 12/2005 | Peled et al. |
| 2006/0012815 A1 | 1/2006 | Edner |
| 2006/0037076 A1 | 2/2006 | Roy |
| 2006/0195575 A1 | 8/2006 | Delany et al. |
| 2006/0253447 A1 | 11/2006 | Judge |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 * | 9/2008 | Brainos ............... H04L 1/0002 375/221 |
| 2008/0255997 A1 | 10/2008 | Bluhm |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2011/0004771 A1 | 1/2011 | Matsushima |
| 2011/0179492 A1 | 7/2011 | Markopoulou |
| 2011/0276604 A1 | 11/2011 | Hom et al. |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0260341 A1 | 10/2012 | Chan et al. |
| 2013/0104191 A1 | 4/2013 | Peled et al. |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta |
| 2014/0222712 A1 | 8/2014 | Samaha |
| 2014/0373151 A1 | 12/2014 | Webb et al. |
| 2015/0019323 A1 | 1/2015 | Goldberg |
| 2015/0040225 A1 | 2/2015 | Coates et al. |
| 2015/0135287 A1 | 5/2015 | Medeiros et al. |
| 2015/0156212 A1 | 6/2015 | Khatri et al. |
| 2015/0186618 A1 | 7/2015 | Poorvin |
| 2015/0222652 A1 | 8/2015 | Ramsey et al. |
| 2015/0271047 A1 | 9/2015 | McLean |
| 2015/0324457 A1 | 11/2015 | McLean |
| 2016/0014140 A1 | 1/2016 | Akireddy |
| 2016/0014151 A1 | 1/2016 | Prakash |
| 2016/0078365 A1 | 3/2016 | Baumard |
| 2016/0099963 A1 | 4/2016 | Mahaffey |
| 2016/0139886 A1 | 5/2016 | Perdriau |
| 2016/0182546 A1 | 6/2016 | Coates et al. |
| 2016/0241591 A1 | 8/2016 | Ramsey et al. |
| 2016/0313709 A1 | 10/2016 | Biesdorf |
| 2016/0337400 A1 | 11/2016 | Gupta |
| 2016/0342805 A1 | 11/2016 | Lim |
| 2016/0378978 A1 | 12/2016 | Singla |
| 2017/0026343 A1 | 1/2017 | Wardman |
| 2017/0098087 A1 * | 4/2017 | Li ..................... G06F 21/577 |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318034 A1 | 11/2017 | Holland |
| 2018/0077189 A1 * | 3/2018 | Doppke ............. H04L 63/1433 |
| 2018/0089574 A1 | 3/2018 | Goto |
| 2018/0091306 A1 | 3/2018 | Antonopoulos |
| 2018/0124073 A1 | 5/2018 | Scherman |
| 2018/0124085 A1 | 5/2018 | Frayman |
| 2018/0181599 A1 | 6/2018 | Crabtree |
| 2018/0367550 A1 | 12/2018 | Musuvathi |
| 2019/0014149 A1 | 1/2019 | Cleveland et al. |
| 2019/0095801 A1 | 3/2019 | Saillet |
| 2019/0132344 A1 | 5/2019 | Lem et al. |
| 2019/0141079 A1 | 5/2019 | Vidas |
| 2019/0149564 A1 | 5/2019 | McLean |
| 2019/0342296 A1 * | 11/2019 | Anandam ............ H04L 63/101 |
| 2019/0050554 A1 | 12/2019 | Fiske |
| 2019/0377832 A1 | 12/2019 | McLean et al. |
| 2019/0379678 A1 | 12/2019 | McLean et al. |

(56) References Cited

U.S. PATENT DOCUMENTS

OTHER PUBLICATIONS

Secureworks—Log, Management—Protect your infrastructure from known and emerging threats; www.secureworks.com/resources/ds-log-management; 2015 (available).
Sofya Raskhodnikova & Adam Smith; CSE 598A Algorithmic Challenges in Data Privacy; Lecture 2; Jan. 19, 2010.

* cited by examiner

FIG. 7

COMPUTER IMPLEMENTED SYSTEM AND METHOD, AND COMPUTER PROGRAM PRODUCT FOR REVERSIBLY REMEDIATING A SECURITY RISK

CROSS REFERENCE TO RELATED APPLICATIONS

The present patent application claims the benefit of the filing date of previously filed, U.S. Provisional Patent Application Ser. No. 62/426,962, filed Nov. 28, 2016.

INCORPORATION BY REFERENCE

The specification and drawings of U.S. Provisional Patent Application Ser. No. 62/426,962, filed Nov. 28, 2016, are specifically incorporated herein by reference as if set forth in their entirety.

TECHNICAL FIELD

This disclosure relates generally to information handling systems, and more particularly relates to reversibly remediating a security risk.

BACKGROUND

While an enterprise's computing needs are increasingly being managed via cloud computing services, maintaining information security in a cloud computing environment presents unique technological challenges. While existing information security products and services may detect and remediate security risks in computer networks and systems, including cloud computing networks, one disadvantage with conventional cloud computing products and services such as Amazon Web Services (AWS), is that they generally remediate risks in a way that is not reversible. For example, a web service may require multi factor authentication (MFA). In the event that a user fails an MFA requirement, conventional systems and methods often remediate such a security risk by deleting the user's password. A disadvantage of such a remediation plan, however, is that it is generally not automatically reversible. Rather, a user may be required to make telephonic or other contact with a customer service representative in order to obtain a new, valid password. What is needed, therefore, is a system and method for reversibly repairing a security risk that addresses these issues, as well as other related and unrelated issues in the art.

SUMMARY

The present disclosure is directed to a computer implemented system and method, and a computer program product or system, for reversibly remediating a security risk in an automated manner.

In one aspect, a method or process for reversibly remediating a security risk can include determining, setting, or implementing one or more policies or parameters for selected or applicable actions for mitigation of a detected or identified security risk. The method further can include monitoring a network or system for one or more indicators of a security risk, and upon detection or identification of a security risk, taking or applying one or more remedial actions applicable to remedy or mitigate the identified security risk. The system or network can then be continuously monitored for a change in the identified security risk, and if the security risk is remedied or corrected, the applied risk-mitigating action can be automatically reversed.

In some exemplary embodiments, the systems and methods of the present disclosure may be implemented as Software as a Service (SaaS). In one example embodiment, the present disclosure is applicable to use with systems or servers including remote web services such as Amazon Web Service (AWS) for implementing security policies, monitoring communications with the web service to detect security risks, and reversibly remediating the detected security risks. The system according to embodiments of the present disclosure can monitor a network or system, for example, using a method such as accessing an application programming interface (API) on a remote web service, and provide an alert upon the detection of a communication or action that may be a security risk, and apply a repair policy to a client web service environment thereby dynamically achieving a secure and compliant network environment. In some exemplary embodiments, an enterprise using a remote web service can establish and apply configuration policies for their web service accounts.

A remote web service user can associate one or more web services accounts with an exemplary embodiment of the security risk remediation system of the present disclosure. As may be appreciated, the security risk remediation system may be implemented via one or more virtual or physical machines. The system runs best practices or configuration checks against communications with a remote web service, and displays information about security risks to a user. A user may then be presented with one or more options for remedying each identified security risk and can then select one or more of the presented options.

In addition, the security risk remediation service can continuously monitor all communications, such as API calls, to or with a platform or web service. Upon detection of a security risk, one or more reversible remediation options may be presented to a user. In some exemplary embodiments, the platform or web service may provide an API to a monitoring service. For example, in embodiments where the platform being monitored is Amazon Web Services, a security risk may be detected via an Amazon CloudWatch event, which may be run at regular time intervals.

Security and configuration best practices may be developed based on the opinions of information security professionals, industry benchmarks, and/or regulatory or compliance standards, such as the Payment Card Industry Data Security Standard (PCI DSS). Such best practices may then be embodied in one or more reversible remediation plans or policies, which can be implemented via a computer programming code or workflow that implements exemplary embodiments of the security risk remediation service of the present disclosure. Upon the detection of a security risk, the security risk remediation service may present multiple remediation options to a user.

In some exemplary embodiments, templates may be used to implement the security risk remediation service of the present disclosure. If the web service being monitored is an Amazon Web Service, for example, AWS Cloud Formation templates may be used to provision and manage an exemplary embodiment of a network risk threat remediation service. In addition, automated remediation, and reversal of remediation, may be implemented by using a serverless computer service, such as AWS Lambda, which is available from Amazon®. In some exemplary embodiments, when remediation options are presented to a user, a "protect" mode option also may be made available. If the "protect" mode is activated, the selected remediation option will be continuously applied to future communications and/or API calls until the "protect" mode is deactivated. In exemplary embodiments, user customized security checks as well as wrapped checks may be implemented via the security risk remediation service of the present disclosure.

An exemplary method for implementing a security risk remediation service may include the following operations, at least one of which may be performed by a computer processor. In a first operation, the method may scan an API or web service to identify security risks.

In another operation, the method may generate, or otherwise access or receive information about, one or more plans to remediate or otherwise repair or resolve identified security risks. In some exemplary embodiments, the method may cause Get*( ) and Describe*( ) API calls to be issued in order to do so. Additionally, with some embodiments, the method can include pushing or presenting a payload (script, binary, etc.) to a remote service to scan for issues, risks, etc.

In another operation, which may be concurrent with generating a repair plan, the method may generate, or otherwise access or receive information about, a revert plan, which is a plan to reverse the repair of the identified security risks. In some exemplary embodiments, the method may cause Get*( ) and Describe*( ) API calls to be issued in order to do so, or push a payload to a remote service to scan for issues, risks, etc.

In another operation, the method may determine, or otherwise access or receive information about a quality score for each of the repair and revert plans according to (a) how effectively each repair plan remediates the identified security risks and (b) how completely each repair can be reversed.

In another operation, the method may automatically apply the highest quality repair plan. The method also may cause information to be sent to a user to notify the user of the repair of a detected security risk. The method also may present a user with an option to reverse the repair.

In another operation, if the method did not automatically apply the highest repair plan, the method may display information about the identified security risk and information about the repair or revert plans available for remediating the security risk. In some exemplary embodiments, the method may allow a user to edit or otherwise change information about the repair plan(s) selected by the user for remediation.

In another operation, again, if the method did not automatically apply the highest value or quality scored repair plan, the method may receive information from a user indicating that a user wants to select and apply a specific repair to the identified security risk.

In response to receiving information indicating that a user has selected a repair or revert plan, if the selected repair plan is of an acceptable value or quality score, the method causes the selected repair plan to be executed. In some exemplary embodiments, the method also may display information indicating that the selected repair plan has been executed and the identified security risk has been resolved.

In another operation, the method further can provide a user with an option to reverse the selected repair plan that has been executed. If the method receives information indicating that a user wants to reverse a selected repair, the method may cause the repair to be reversed.

An advantage of the security risk remediation system/service of the present disclosure is that by generating plans for the repair and reversal of the repair in advance of executing the repair, the repair can be more effectively and completely reverted.

Various objects, features and advantages of the present disclosure will become apparent to those skilled in the art upon a review of the following detailed description, when taken in conjunction with the accompanying drawings.

DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which:

FIG. 7 is a screenshot of an exemplary user interface for connecting a web services account with a security risk remediation service, in accordance with some exemplary embodiments.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. As shown in FIGS. 1-11, the present disclosure can provide a system, platform, or other computer program product for reversibly remediating a security risk in an automated manner.

Figure 1:
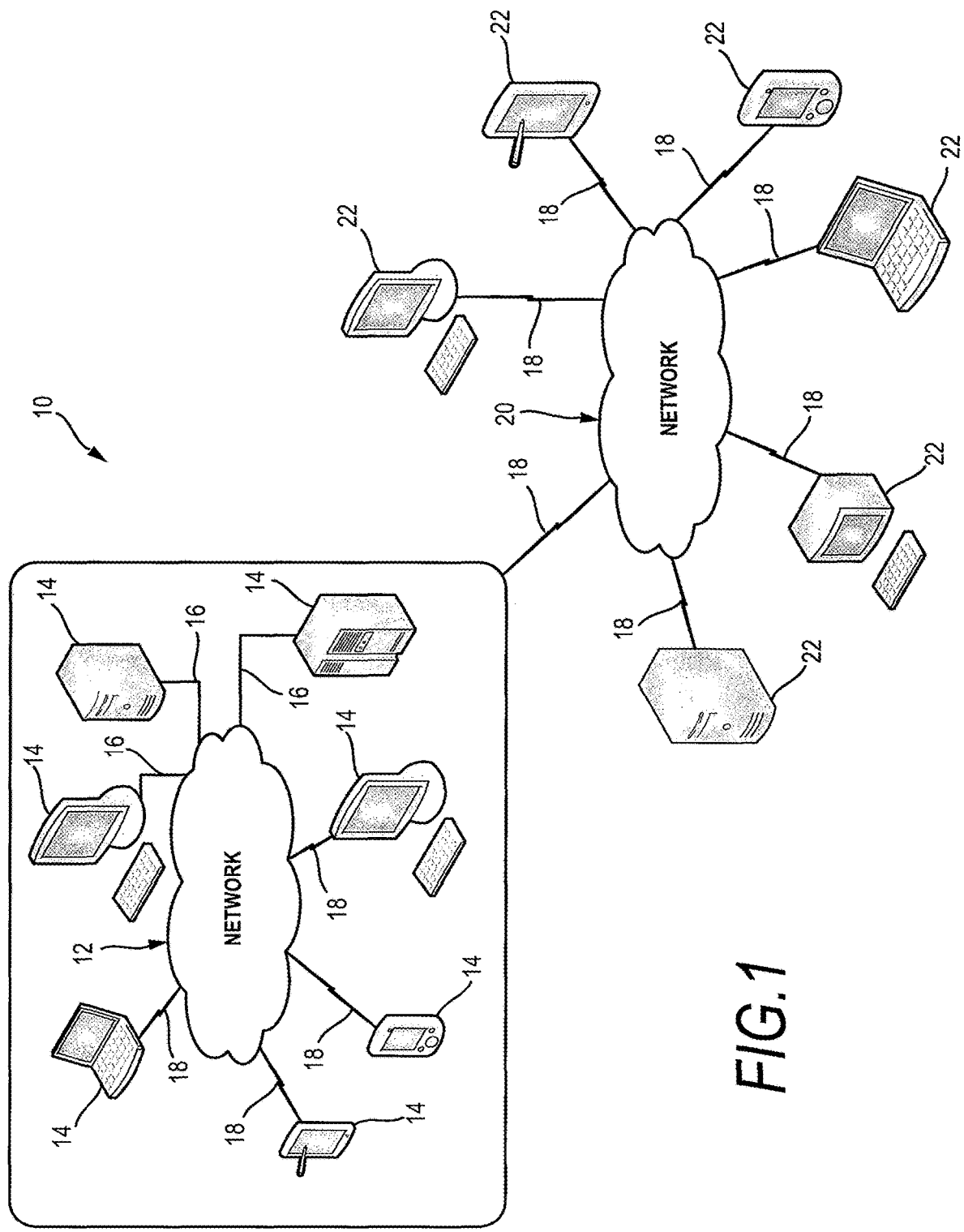
FIG. 1 is a schematic diagram of a data center including a networked system of information handling systems according to one aspect of the present disclosure.

FIG. 1 is a block diagram of an exemplary data center 10 that may be managed by a service provider. As shown in FIG. 1, the data center 10 can include a network 12 that may provide communications among a plurality of information handling systems 14, which can include work stations, personal computers, smart cellular telephones, personal digital assistants, laptop computers, servers, other suitable devices, and/or combinations thereof. The information handling systems 14 further can be coupled to the network 12 through wired line connections 16, wireless connections 18, or any other suitable lines of communication or connection. As further shown in FIG. 1, the data center 10, and/or one or more of the information handling systems 14 thereof, can be communicatively coupled to a network, including a cloud based or other network as shown at 12 or 20 in FIG. 1, for example, through wired line connection 16, or through any other suitable connection, such as a wireless connection 18 (e.g., WiFi, cellular, etc.). The network further can be accessible to/by one or more user or client managed information handling systems or devices 22 to facilitate communication between the client managed information handling systems 22 and the data center 10 managed by the service provider. The network can include an API interface of a web service provider, though the network can include any suitable network, such as the Internet or other wide area network, a local area network, or a combination of networks, and may provide communications, e.g., data communications, among the service provider and the client managed information handling systems 22.

The client managed information handling systems 22 can be connected to the network 20 through wired connections, e.g., an Ethernet cable, or other suitable wired or wireless connections 18, e.g., WiFi, Bluetooth®, cellular connections (e.g., 3G, 4G, LTE, 5G, etc.), other suitable wireless connections or combinations thereof (FIG. 1), to enable the clients or operators of information handling systems 22 to communicate with the service provider, e.g., to access one or more services provided thereby. For example, the service provider can be a web service provider, such as Amazon Web Services or other suitable web services. However, the service provider can be any suitable service provider, without departing from the present disclosure, for example, online gaming service providers, social media or online dating service providers, online data storage service providers, online retailer service providers, health services providers, financial services providers, etc.

For purposes of the present disclosure, the information handling systems 14/22 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include a storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling systems also may include one or more buses operable to transmit communications between the various hardware components.

Figure 2:
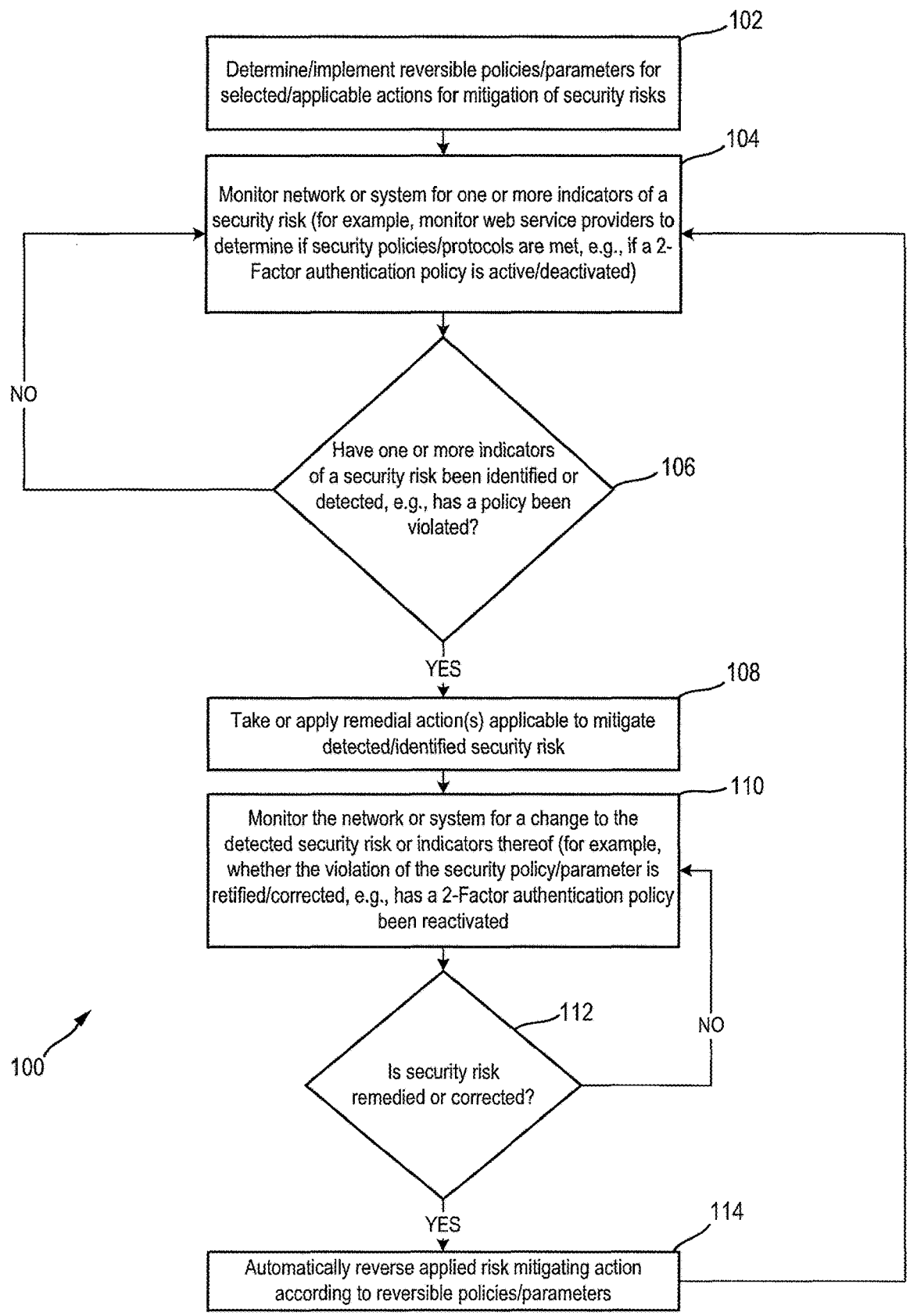
FIG. 2 shows a method/process for reversibly remediating a security risk according to one aspect of the present disclosure.
Figure 11:
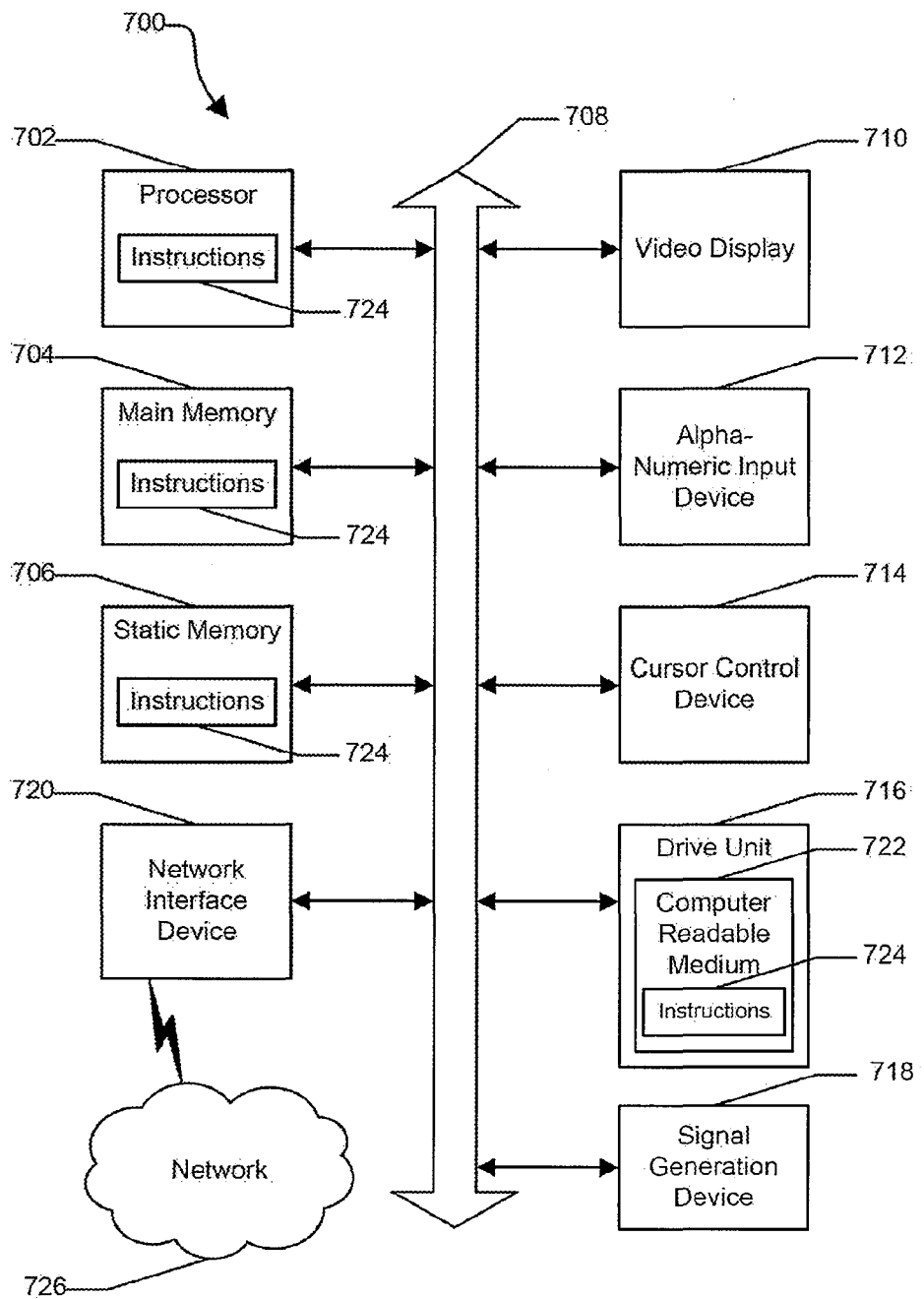
FIG. 11 is a screenshot of an exemplary user interface displaying information about automatically applying, or reversing, the remediation of the specific risk detected by the security risk remediation service's monitoring of a web services account, in accordance with some exemplary embodiments.

FIG. 2 shows a method or process 100 for operation of the software system, platform or program product to reversibly remediate a security risk according to embodiments of the present disclosure. A security risk can include any action, threat, issue, etc., that increases the probability of or potential for harm, loss, damage, etc. The software system or product according to embodiments of the present disclosure can be accessed by or can run on one or more of the information handling systems, e.g., a work flow or instructions, etc., can be carried out by a processor (e.g., a processor 702 as shown in FIG. 11) or other suitable component on the information handling systems 14, though the software system, platform or program product or components/portions thereof can be run on or accessed by the information handling systems 22 or any other devices or modules or systems that may be necessary for its implementation.

At Step 102, the processor may determine, implement, or otherwise access policies or parameters for selected or applicable actions for mitigation of security risks. The processor further may monitor or scan the system or network 20/12 (FIG. 1), e.g., monitor communications of the network or system, for one or more indicators of a security risk.

As further shown in FIG. 2, the processor can determine whether one or more indicators of a security risk have been identified or detected, for example, the processor may determine whether one or more of the applicable system or network/service security policies or parameters has been violated (at Step 106). In one example embodiment, the processor may monitor a network using a web service provider, e.g., such as by accessing an application programming interface (API) on a remote web service, to determine if security policies or parameters are met, for example, if a two-factor authentication policy is activated or deactivated, or if other suitable policies or protocols are implemented or active. The policies/parameters can include any suitable protocols or parameters developed based on best practices for preventing or mitigating security risks or other security attacks, etc. Best practices can be developed by the client/user for their particular services or systems or can be developed by a third party, such as a third party technology partner(s), managed security service provider (MSSP), security analyst, or other suitable entity, and can include, for example, ensuring proper TLS configuration, enabling the logging of specific activities, e.g., CloudTrail enabled to log API activity; ensuring that firewall configurations restrict access to sensitive services; ensuring a web service inspector, e.g., AWS Inspector, is enabled, requiring instances to be in a load balancer configuration (availability), restricting activity to specific geographic regions, e.g., AWS regions, detecting when a credential is used in a way that violates policy, e.g., a credential has not been rotated in an established time period.

If one or more indicators of a security risk are identified or detected, the processor can take or apply remedial actions applicable to remedy or mitigate the identified security risk. (Step 108.) For example, if a user or other actor with access to the system or network deactivates a required security feature, attribute, or policy, such as a two-factor authentication policy or other required security measure, the processor may lock the user out of their account, reduce privileges assigned to the user/actor, or otherwise reduce or limit their access, for example, generate a second authentication code and/or the like that is not automatically sent to a device or account associated with the user or is not otherwise provided to the user for access to the device or account.

In addition, as shown in FIG. 2, upon application of the remedial action(s), the processor can continuously monitor the network for a change, alteration, or reversal of the identified security risk(s) (at Step 110). In one example embodiment, the processor will determine whether the violated security policy or parameter has been rectified or reversed, for example, whether a deactivated two-factor authentication policy has been activated or reactivated. Upon a determination of a change to the detected threat, i.e., an indication that the risk has been remedied, corrected, or otherwise mitigated to at least a predetermined or threshold level of confidence sufficient to substantially ensure correction of the security risk and/or renewed compliance with the security policies/requirements of the system/network (at Step 112), the processor can automatically reverse the applied risk mitigation action according to the implemented determined or set reversible policies or parameters (at Step 114).

The processor will generally continuously monitor the system or network for indicators of a security risk and repeat Steps 106 to Step 114 for each identified or detected indicator of a security risk.

Figure 3:
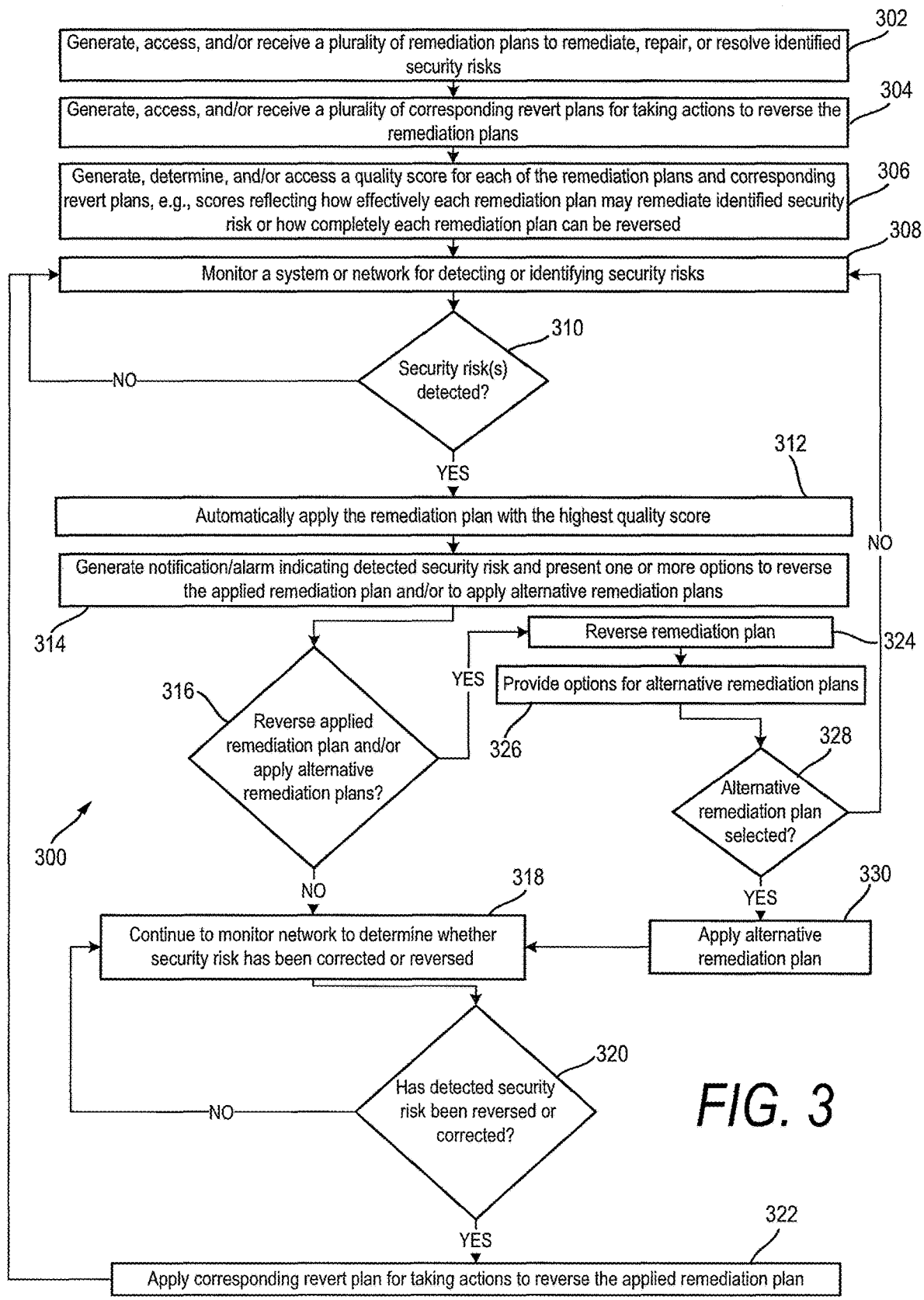
FIG. 3 shows a method/process for reversibly remediating a security risk according to another aspect of the present disclosure.

FIG. 3 shows a method or process for automatically reversibly remediating security risks according to another aspect of the present disclosure. As shown in FIG. 3, the processor can generate, access, or receive a plurality of remediation plans to remediate, repair, or resolve identified security risks (at Step 302). Additionally, the processor can generate, access, and/or otherwise receive a plurality of corresponding revert plans for taking actions to reverse the remediation plans (at Step 304). The remediation plans and revert plans can be generated, accessed, or received simultaneously or in any suitable order, without departing from the scope of the present disclosure. Further, at Step 306, a quality score for each of the remediation plans and corresponding revert plans can be generated, determined and/or accessed. In one example embodiment, the quality score can include a score or other metric or analytic that may reflect how effectively each remediation plan may remediate or correct identified security risks and/or how completely each remediation plan can be reversed.

As further shown in FIG. 3, the processor can continuously monitor a system or network for detecting or identifying security risks (Step 310), and if a security risk(s) is detected, a remediation plan with the highest quality score of the generated or determined quality scores can be automatically applied (at Step 312). Thereafter, at Step 314, a notification or alarm may be generated to indicate a detected security risk, as well as to provide one or more options to reverse the applied remediation plan and/or to apply an alternative remediation plan.

If a user does not want to reverse the applied remediation plan, or apply an alternative remediation plan, the automatically applied remediation plan, selected in accordance with the highest quality score, will continue to be enforced and the network or system will continue to be monitored to detect/determine whether the identified security risk has been corrected or reversed (Step 318). Upon a determination that the identified security risk has been reversed or corrected (Step 320), the corresponding revert plan can be applied to take actions for reversing the automatically applied remediation plan (Step 322).

At Step 316, however, if it is determined that a user would like to reverse the automatically applied remediation plan and/or apply alternative remediation plans, the processor may reverse the remediation plan (Step 326), and/or provide options for alternative remediation plans (Step 326). If an alternative remediation plan is not selected, no remediation plan will be implemented and the system or network will be continued to be monitored for detecting or identifying security risks (Step 308). If an alternative remediation plan is selected, however, the alternative remediation plan can be applied (Step 330), and then the network can be monitored to determine whether the security risk(s) has been corrected or reversed (Step 318). As shown in FIG. 3, if a detected security risk has been reversed (as determined in Step 320), the corresponding revert plan for the selected alternative remediation plan can be applied to reverse the alternative remediation plan (Step 322).

The system or network will continue to be generally continuously monitored for detected or identified security risks, and Steps 308-322 generally will be repeated for each identified/detected security risk.

Figure 4:
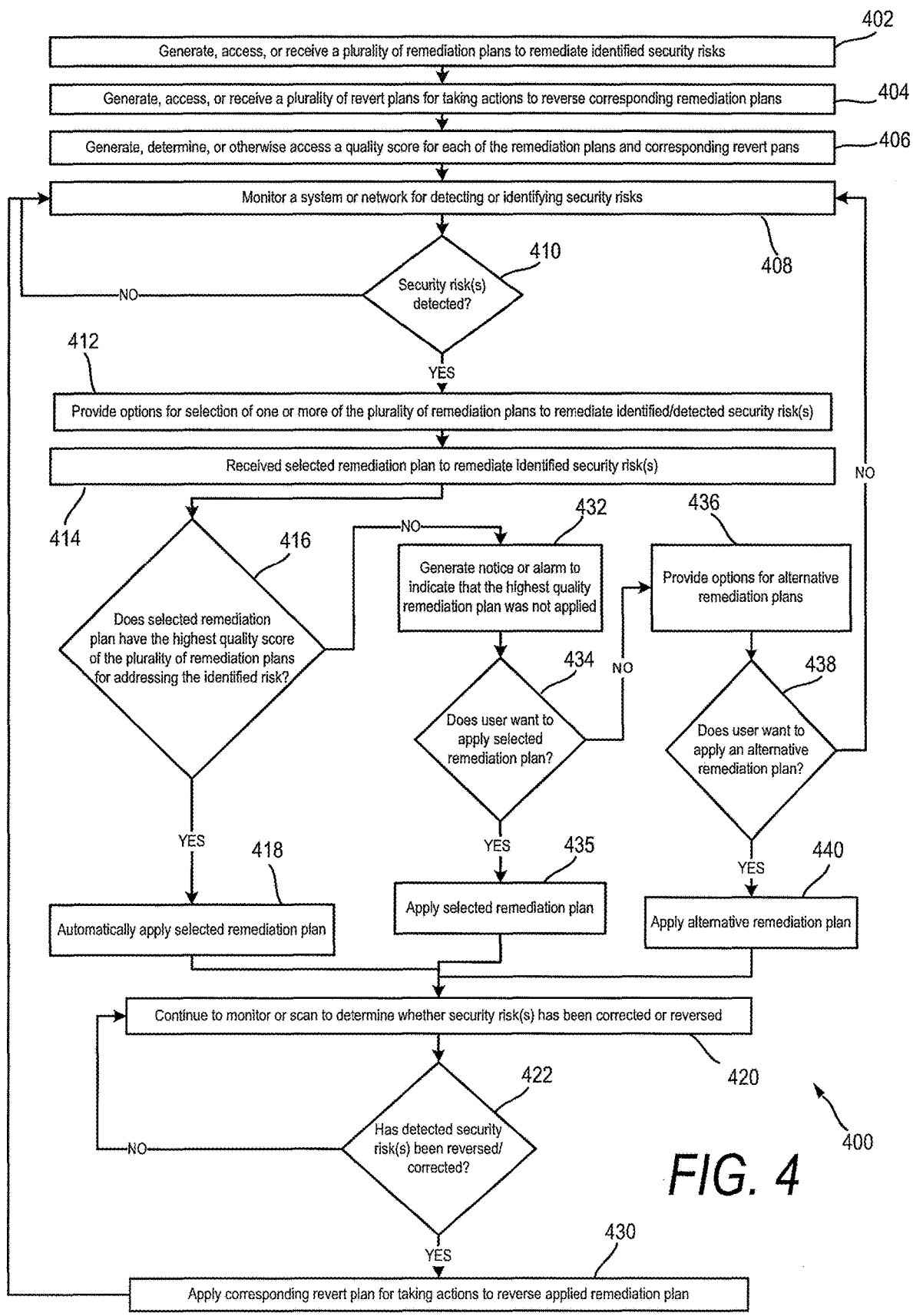
FIG. 4 shows a method/process for reversibly remediating a security risk according to yet another aspect of the present disclosure.

FIG. 4 shows a method or process for reversibly remediating security risk according to yet another aspect of the present application. Steps 402 to 410 shown in FIG. 4 generally correspond to Steps 302 to 310 shown in FIG. 3. As shown in FIG. 4, however, if a security risk is detected, the processor may take actions to present one or more options for selection of one or more of the plurality of remediation plans to remediate the identified security risks for selection by a user (at Step 412). Upon receipt of a user selected remediation plan to remediate the identified security risk (Step 414), a determination will be made as to whether the selected remediation plan has the highest quality score of the plurality of remediation plans for addressing the identified/detected security risk (at Step 416).

If it is determined that the selected remediation plan has the highest quality score in comparison to the other remediation plans, the selected remediation plan may be automatically applied (at Step 418), and the process will monitor or scan to determine whether the security risk has been corrected or reversed (at Step 420). Once a determination is made that the detected security risk has been corrected or reversed (at Step 422), the corresponding revert plan for taking actions to reverse the applied/selected remediation plan can be applied.

At Step 416, if it is determined that the selected remediation plan does not have a selected or pre-determined highest quality score, e.g. based on statistical or historical probability analysis, or other scoring method as will be understood by persons of skill in the art, for the plurality of remediation plans provided or otherwise made available for addressing the identified or detected security risk, a notice or alarm may be generated to indicate that the highest quality remediation plan was not applied or selected (at Step 432). The user further may be prompted to determine whether the user still wants to apply the selected remediation plan, and if a determination is made that the user still wants to apply the selected remediation plan (at Step 434), the selected remediation plan will be applied (at Step 435) and the processor will continue on to Steps 420 to 430.

As further shown in FIG. 4, if the user does not want to apply the proposed and/or selected remediation plan, however, one or more options may be provided to the user for selection of an alternative remediation plan, e.g., a list or other grouping of options for remediation plans (at Step 436). If it is determined that the user does not want to apply an alternative plan, no remediation plan will be applied and the network or system will be continued to be monitored or scanned to detect or identify security risks. If a user selects an alternative remediation plan, the alternative remediation plan will be applied (at Step 440), and then the processor can monitor the system or network to determine whether the security risk has been corrected or reversed. If the detected or identified security risk has been corrected or reversed, i.e., a changed condition is determined indicating the remedial action has addressed the identified/detected risk to at least a predetermined or threshold level of confidence, the corresponding revert plan for taking actions to reverse the applied or selected alternative remediation plan can be applied or otherwise implemented to reverse the applied/selected alternative remediation plan (Step 430).

The processor generally will continue to monitor or scan the network or system for detecting or identifying security risks, and Steps 410 through 430 can be repeated for each detected security risk.

Figure 5:
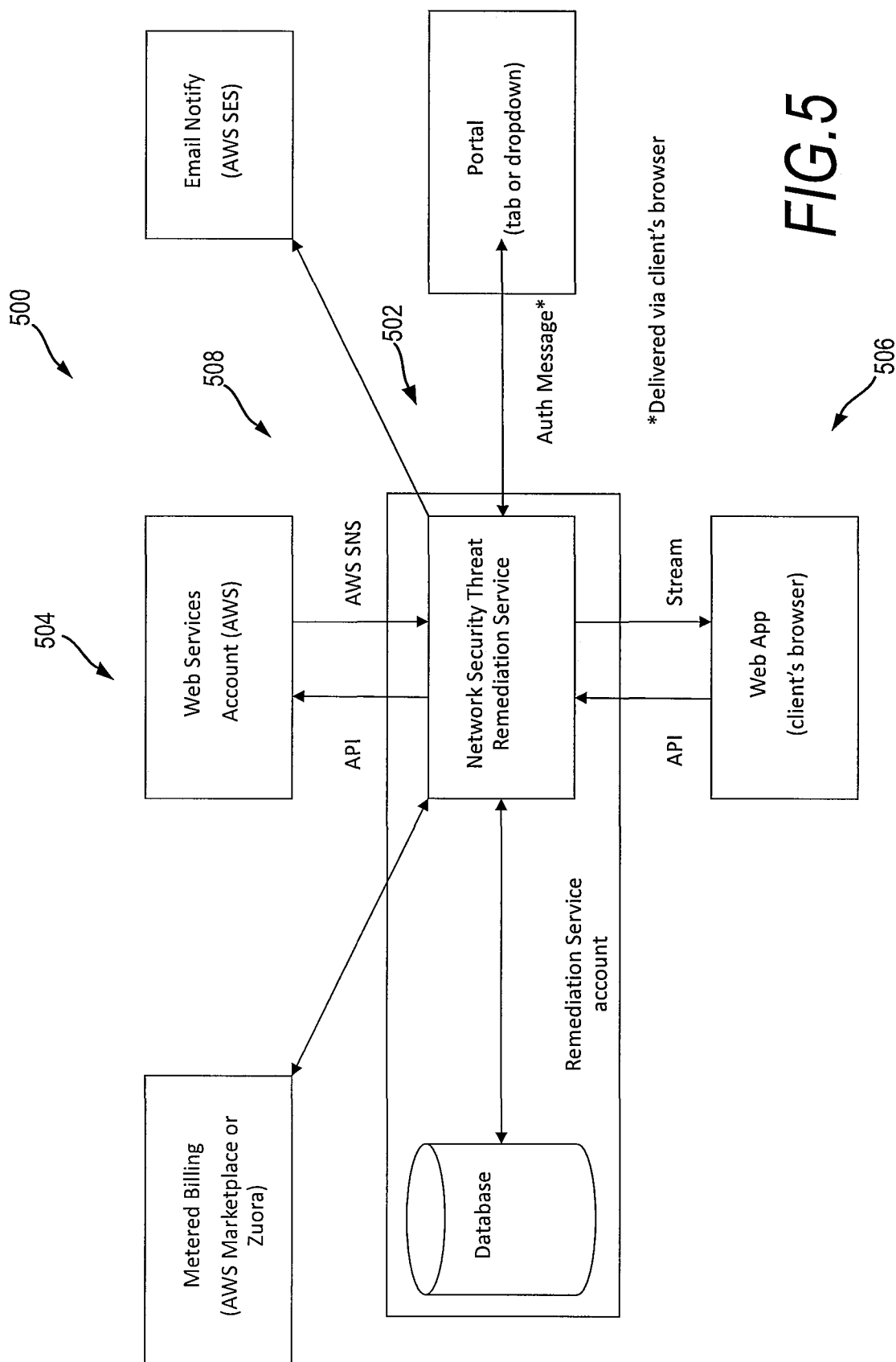

FIG. 5 is a block diagram illustrating a system 500 including a product, service or platform 502 for reversibly remediating a security risk attendant to the use of a web service 504, in accordance with some exemplary embodiments. In some exemplary embodiments, the embodiments of the product, service, or platform may be implemented as Software as a Service (SaaS), though any suitable platform, service, etc., can be implemented without departing from the present disclosure. In one embodiment, the present disclosure may address configuration complexity of a remote web service such as Amazon Web Services (AWS) by implementing security policies, monitoring communications with the web service to detect security risks, and reversibly remediating the detected security risks. As generally shown in FIG. 5, the platform 502 can monitor communications in a network 508, such as an application programming interface (API) call to a remote web service 504, that provides an alert upon the detection of a communication that may be a security risk, and applies a repair policy to a client web service environment thereby dynamically achieving a secure and compliant network environment. In some exemplary embodiments, an enterprise using a remote web service can establish and apply configuration policies to their web service accounts.

In some exemplary embodiments, a remote web service user associates one or more web services accounts with an exemplary embodiment of the security risk remediation system of the present disclosure. As may be appreciated, the security risk remediation system may be implemented via one or more virtual or physical machines. The system runs configuration checks against the client's environment, for example by accessing, retrieving, describing, or interrogating a remote web service, and displays information about security risks to a user (e.g., on a display 710 as shown in FIG. 11). A user may then be presented with one or more options for remedying each identified security risk and can then select one or more of the presented options. For example, the notification or other options can be provided on a display (e.g., video display 710 as shown in FIG. 11) of the user's/client's information handling system.

In some exemplary embodiments, the security risk remediation service/platform 502 continuously monitors all communications with, such as API calls to, a web service. Upon detection of a security risk, one or more reversible remediation options may be presented to a user. In some exemplary embodiments, a web service may provide an API to a monitoring service. For example, in embodiments where the web service being monitored is Amazon Web Services, a security risk may be detected via an Amazon CloudWatch event, which may be run at regular time intervals.

Security and configuration best practices may be developed based on the opinions of information security professionals, industry benchmarks, and/or regulatory or compliance standards, such as the Payment Card Industry Data Security Standard (PCI DSS). Such best practices may then be embodied in one or more reversible remediation plans or policies, which can be implemented via a computer programming code that implements exemplary embodiments of the security risk remediation service of the present disclosure. Upon the detection of a security risk, the security risk remediation service may present multiple remediation options to a user.

In some exemplary embodiments, templates may be used to implement the security risk remediation service of the present disclosure. If the web service being monitored is Amazon Web Services, AWS Cloud Formation templates may be used to provision and manage an exemplary embodiment of a security risk remediation service. In addition, automated remediation, and reversal of remediation, may be implemented by using a serverless compute service, such as AWS Lambda, which is available from Amazon®. In some exemplary embodiments, when remediation options are presented to a user, a "protect" mode option also may be made available. If the "protect" mode is activated, the selected remediation option will be continuously applied to future communications and/or API calls until the "protect" mode is deactivated. In exemplary embodiments, user-customized security checks may be implemented via the security risk remediation service of the present disclosure.

An advantage of the security risk remediation service of the present disclosure is that by generating plans for the repair and reversal of the repair in advance of executing the repair, the repair can be more effectively and completely reverted.

Figure 6:
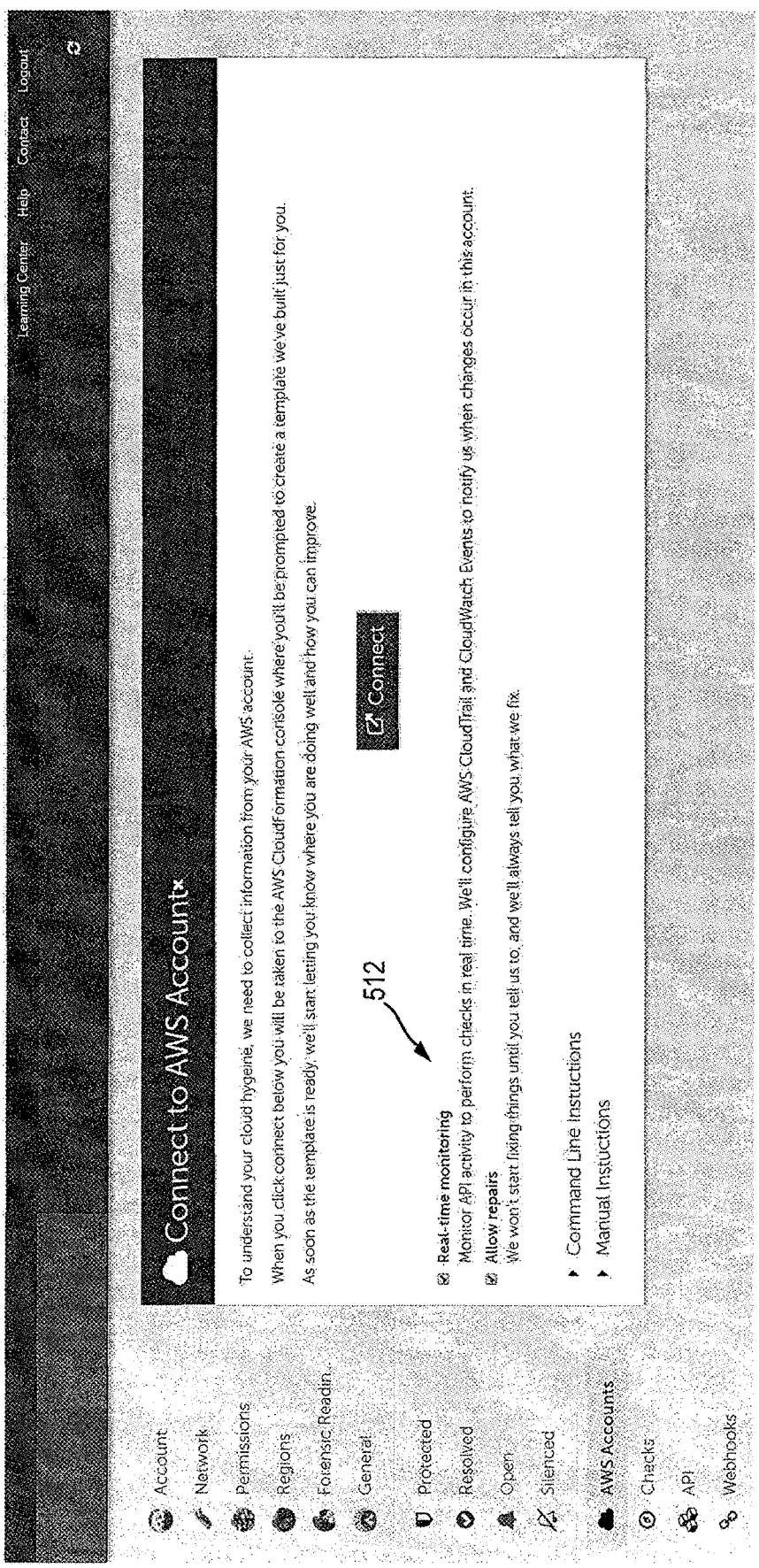
FIG. 6 is a block diagram illustrating a system for providing a service for reversibly remediating a security risk attendant to the use of a web service, in accordance with one exemplary embodiment.

FIG. 6 is a screenshot of an exemplary user interface 510 for connecting a web services account with a security risk remediation service, in accordance with some exemplary embodiments. As shown a user may be presented or given one or more options 512, for example, to enable real time monitoring of a web service and to allow repairs when security risks are detected.

Figure 7:
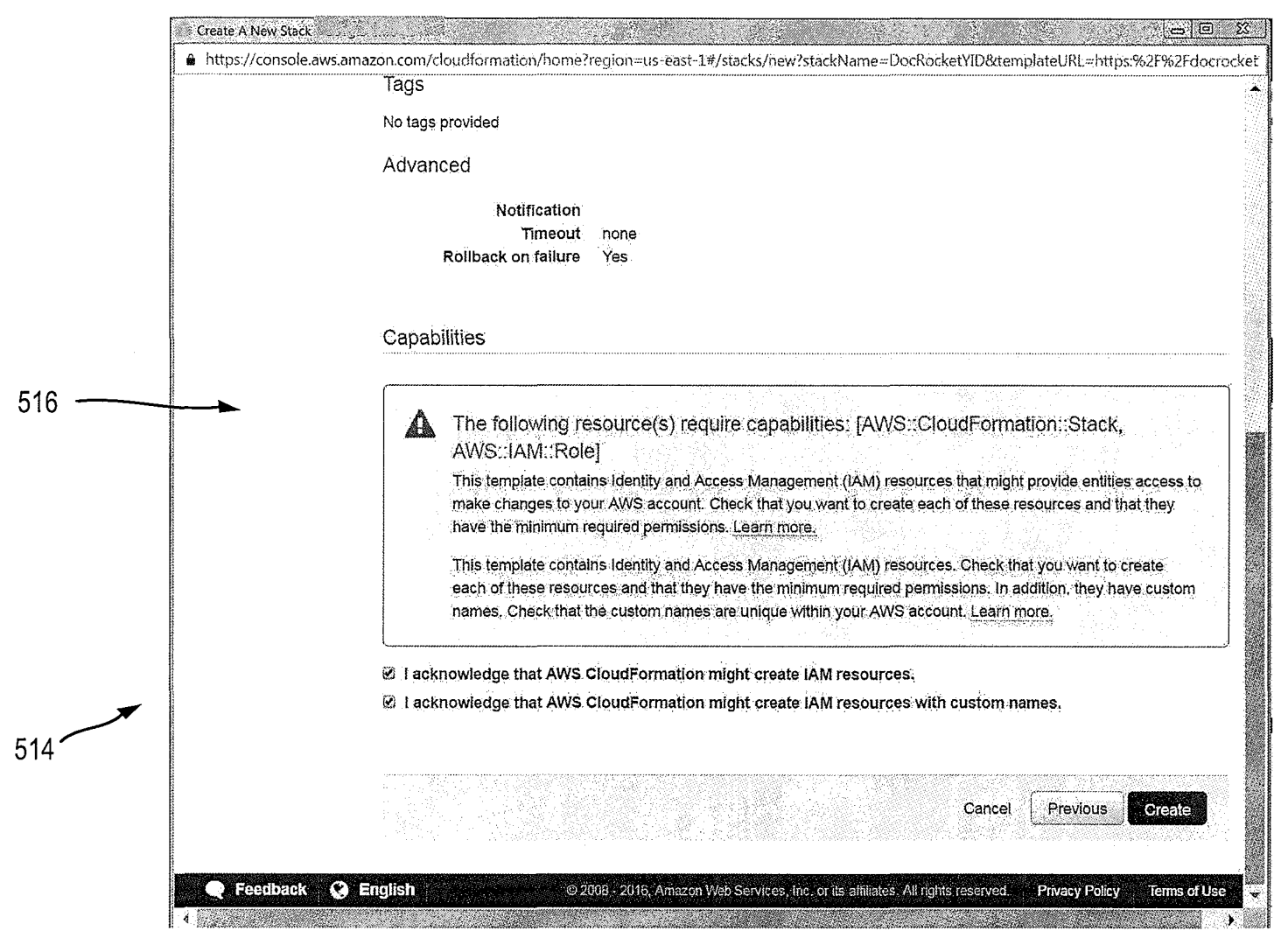

FIG. 7 is a screenshot of an exemplary user interface 514 to identify with and access management service for providing a security risk remediation service with access to a web services account, in accordance with some exemplary embodiments. After connecting to a web services account, a user may be passed to a web services console 516 to deploy a security risk remediation service via template. If the web service is Amazon Web Services, a Cloud Formation template may be used to create AWS Identity and Access Management (JAM) cross account roles for the security risk remediation service, which enables the service to monitor a web service account and apply remediation measures.

Figure 8:
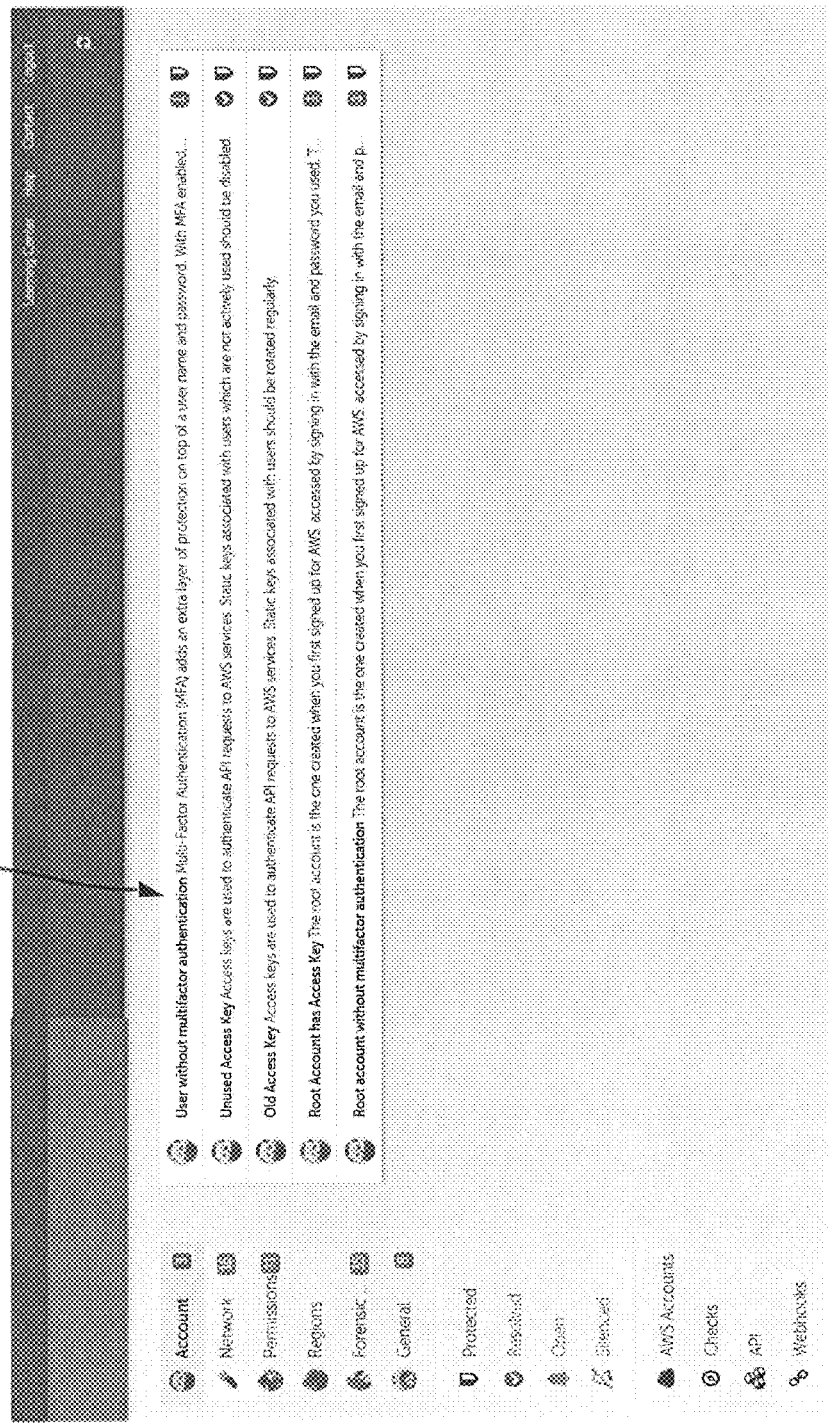
FIG. 8 is a screenshot of an exemplary user interface of an identity and access management service for providing a security risk remediation service with access to a web services account, in accordance with some exemplary embodiments.

FIG. 8 is a screenshot of an exemplary user interface 518 of an identity and access management service for displaying information about risks detected by a security risk remediation service's monitoring of a web services account, in accordance with some exemplary embodiments. The security risk remediation service can run a check after the web services account is connected to the service. Identified security issues 520 are displayed and information about the number of issues and the categories of issues also may be displayed.

Figure 9:
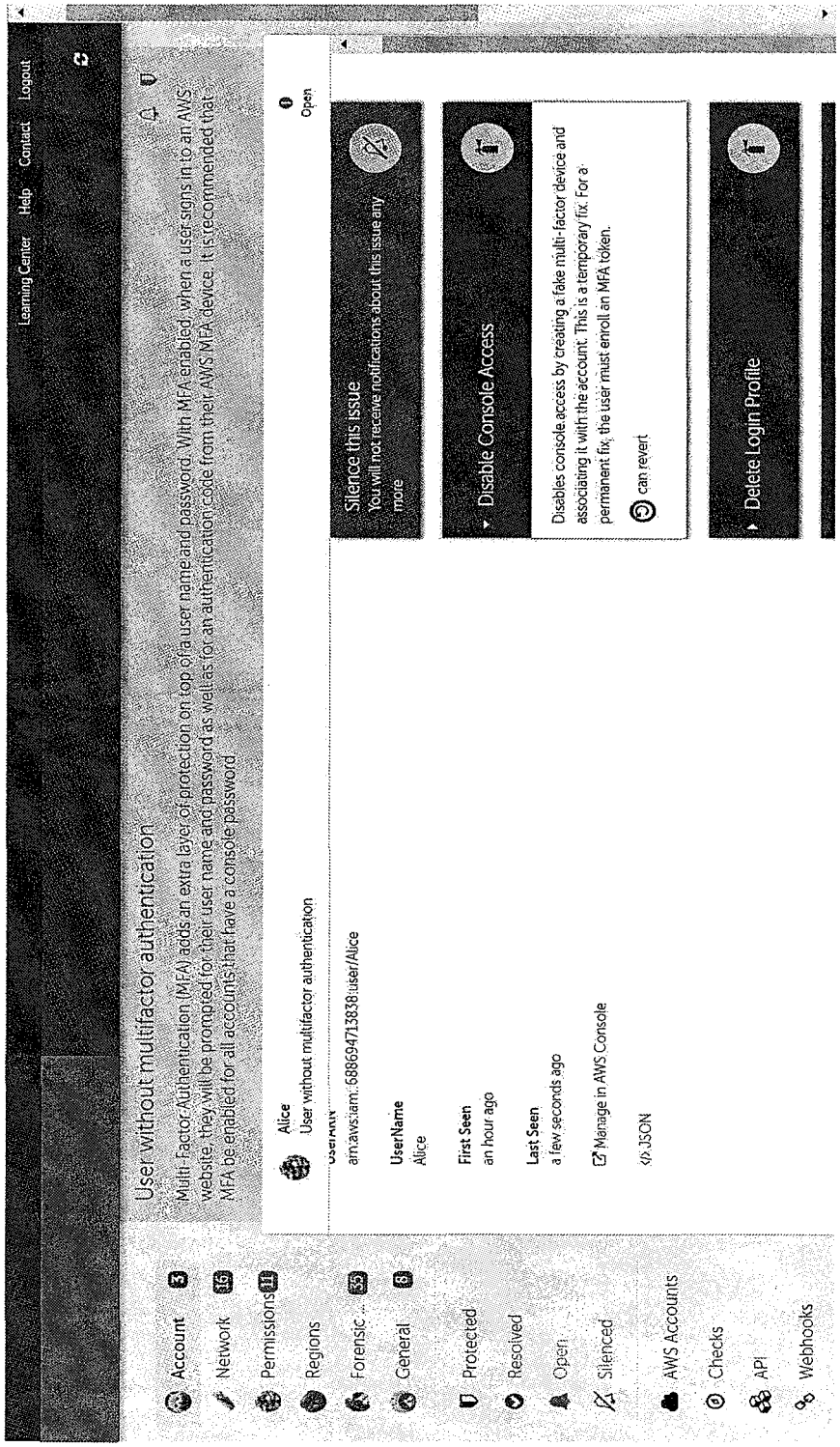
FIG. 9 is a screenshot of an exemplary user interface for displaying information about threats detected by a security risk remediation service's monitoring of a web services account, in accordance with some exemplary embodiments.

FIG. 9 is a screenshot of an exemplary user interface 522 displaying more detailed information about a specific risk detected by a security risk remediation service's monitoring of a web services account, in accordance with some exemplary embodiments. FIG. 9 illustrates that the identified security risk can include a user without Multi-Factor Authentication enabled. As shown in FIG. 9, a user may be given an option to deploy a remediation measure, e.g., silence the issue or be passed to the web services console to remediate the issue.

Figure 10:
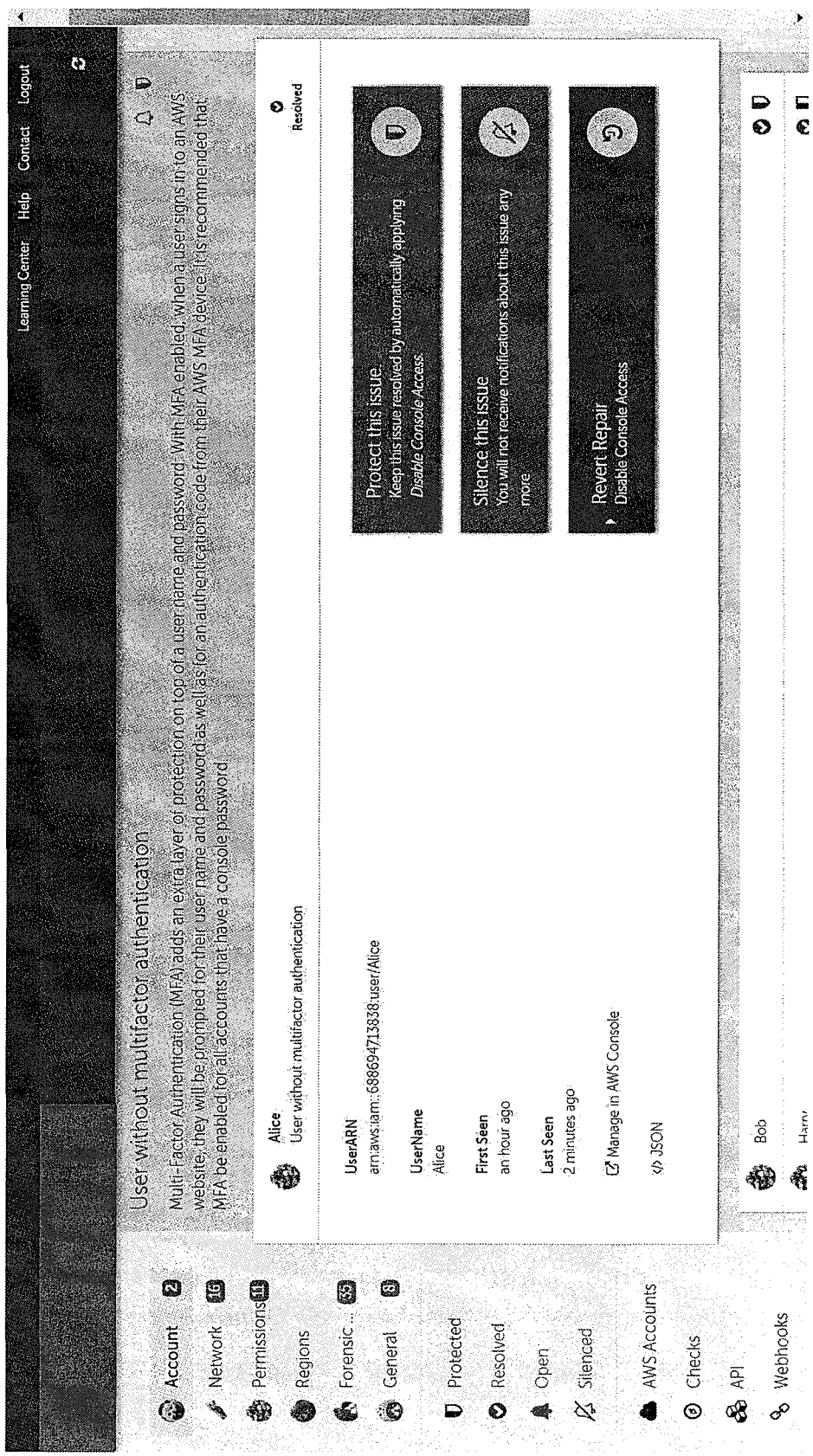
FIG. 10 is a screenshot of an exemplary user interface displaying more detailed information about a specific risk detected by a security risk remediation service's monitoring of a web services account, in accordance with some exemplary embodiments.

FIG. 10 is a screenshot of an exemplary user interface 524 displaying information about automatically applying, or reversing, the remediation of the specific risk detected by the security risk remediation service's monitoring of a web services account, in accordance with some exemplary embodiments. If a user elects to apply a selected repair to a detected security risk, the repair is executed, the check is run again and information is displayed that confirms the security risk was resolved. As shown in FIG. 10, a user may be provided an option to enable a protect mode for the detected risk, which will automatically apply the selected repair/remediation measure if the same security risks are detected in future checks of the web service.

FIG. 11 shows an example of an information handling system 700 capable of administering each of the specific embodiments of the present disclosure and variations thereof. The information handling system 700 can represent the user information handling systems 32 and 42 of FIG. 2. The information handling system 700 may include a computer system or processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. The information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 702), or other network. The network interface 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for reversibly remediating security risks on a computer network, the method comprising:

implementing a plurality of security policies or parameters for selected or applicable remedial actions configured to remedy or mitigate security risks to the computer network, wherein the security risks include actions, threats, or issues that increase the probability of or potential for harm, loss, or damage to the computer network or one or more information handling systems accessing the computer network;

establishing a plurality of reversible policies or parameters for reversing one or more corresponding remedial actions for mitigating the identified security risks;

monitoring the computer network for one or more indicators indicative of a violation of one or more of the security policies or parameters;

upon detection or identification of at least one indicator, applying a selected remedial action based on at least one remedial action plan applicable to remedy or mitigate one or more identified security risks associated with the at least one indicator;

monitoring the network or system for a change, alteration, or reversal of the one or more identified security risks; and upon detection or determination that the one or more identified security risks have been remedied, corrected, or mitigated to at least a threshold level of confidence sufficient to ensure correction of the one or more identified security risks and/or compliance with the one or more security policies or parameters for mitigating identified security risks on the computer network, applying one or more of the established reversible policies or parameters to reverse the applied remedial action.

2. The method of claim 1, further comprising:
accessing and presenting a plurality of remediation plans that determine the remedial action to be taken to remedy or mitigate the one or more identified security risks.

3. The method of claim 2, further comprising:
generating a quality score for each remediation plan of the plurality of remediation plans, wherein the quality score is at least partially based on a determined probability of each remediation plan's ability to address or mitigate the one or more identified security risks.

4. The method of claim 3, wherein the remedial action is based on a remediation plan of the plurality of remediation plans that has the highest quality score for remediating or mitigating the one or more identified security risks.

5. The method of claim 3, wherein:
presenting a user with the plurality of remediation plans; and
receiving a user selected remediation plan of the plurality of remediation plans to at least partially remedy or mitigate the one or more identified security risks.

6. The method of claim 5, further comprising:
upon receipt of the user selected remediation plan, determining whether the user selected remediation plan has the highest quality score for remediating the one or more identified security risks.

7. The method of claim 6, further comprising:
automatically applying the user selected remediation plan if the user selected remediation plan has the highest quality score.

8. The method of claim 6, wherein if the user selected remediation plan does not have the highest quality score for remediating the one or more identified security risks, providing an option for the user to apply the user selected remediation plan, and/or providing options for applying alternative remediation plans to the user.

9. A system for reversibly remediating security risks on a computer network, comprising:

a processor in communication with and operable to monitor the computer network to detect or determine potential security risks including actions, threats, or issues that increase the probability of or potential for harm, loss, or damage to the computer network or one or more of the information handling systems accessing the computer network, the processor accessing programming stored in a non-transitory computer readable medium, such that the processor is configured to:

a. access a plurality of security policies or parameters for selected or applicable remedial actions configured to mitigate the security risks;
 b. detect or determine indicators representative of whether the security policies or parameters for mitigating the security risks on the computer network have been violated;
 c. apply a selected remedial action applicable to remedy or mitigate an identified security risk responsive to detection or determination of one or more indicators representing a violation of the security policies or parameters;
 d. monitor the computer network and determine if the identified security risk has been remedied, corrected, or mitigated;
 e. automatically reverse the applied remediation action upon detection of a change to the computer network indicating a correction, mitigation, or remedying of the identified security risk to at least a threshold level of security sufficient to ensure correction of the one or more identified security risks and/or compliance with the security policies or parameters for mitigating the security risks on the computer network; and
 f. repeat steps c.-e. for each detected or determined indicator representing violations of the security policies or parameters.

10. The system of claim 9, wherein the processor is operable to access a plurality of remediation plans that determine and apply a selected remedial action to be taken to remedy or mitigate one or more of the security risks.

11. The system of claim 10, wherein the processor is operable to generate a quality score for each remediation plan of the plurality of remediation plans, wherein the quality score is at least partially based on each remediation plan's ability to address or mitigate the identified security risk.

12. The system of claim 11, wherein the processor is operable to automatically apply a remedial action prescribed by a remediation plan of the plurality of remediation plans that has the highest quality score for mitigating or remediating the identified security risk.

13. The system of claim 9, wherein the processor is configured to present a user with the plurality of remediation plans to remedy or mitigate the identified security risk, and receive a user selected remediation plan of the plurality of remediation plans.

14. The system of claim 13, wherein the processor further comprises programming to determine whether the user selected remediation plan has a highest quality score for mitigating or remediating the identified security risk.

15. The system of claim 14, wherein the processor automatically applies the user selected remediation plan if the user selected remediation plan has the highest quality score, and if the user selected remediation plan does not have the highest quality score for remediating the identified security risk, the processor provides an option for the user to apply the remediation plan and/or options for applying alternative remediation plans.

16. The method of claim 1, wherein the computer network includes an API interface of a web service provider, a wide area network, a local area network, or combinations thereof.

17. The system of claim 9, wherein the computer network includes an API interface of a web service provider, a wide area network, a local area network, or combinations thereof.

\* \* \* \* \*

UNITED STATES PATENT AND TRADEMARK OFFICE
CERTIFICATE OF CORRECTION

| | |
|---|---|
| PATENT NO. | : 10,841,337 B2 |
| APPLICATION NO. | : 15/816133 |
| DATED | : November 17, 2020 |
| INVENTOR(S) | : Kinder et al. |

It is certified that error appears in the above-identified patent and that said Letters Patent is hereby corrected as shown below:

In the Specification
At Column 4, Line 27, please replace "FIG. 6" with --FIG. 5--.
At Column 4, Line 31, please replace "FIG. 7" with --FIG. 6--.
At Column 4, Line 35, please replace "FIG. 8" with --FIG. 7--.
At Column 4, Line 40, please replace "FIG. 9" with --FIG. 8--.
At Column 4, Line 44, please replace "FIG. 10" with --FIG. 9--.
At Column 4, Line 49, please replace "FIG. 11" with --FIG. 10--.
After Column 4, Line 49, please insert --FIG. 11 shows an example of an information handling system 700 capable of administering each of the specific embodiments of the present disclosure and variations thereof.--.

Signed and Sealed this
Seventh Day of March, 2023

Katherine Kelly Vidal
*Director of the United States Patent and Trademark Office*